United States Patent
Roesgen et al.

(10) Patent No.: US 10,702,812 B2
(45) Date of Patent: *Jul. 7, 2020

(54) FILTER HOUSING WITH LOCKING FORM-FIT ELEMENTS AND SPRING LOADING A FILTER ELEMENT IN THE HOUSING

(71) Applicant: MANN+HUMMEL GMBH, Ludwigsburg (DE)

(72) Inventors: André Roesgen, Remshalden (DE); Robert Hasenfratz, Waiblingen (DE); Christian Thalmann, Speyer (DE); Frank Pflueger, Sachsenheim (DE); Fabian Wagner, Moeglingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 24 days.

This patent is subject to a terminal disclaimer.

(21) Appl. No.: 14/288,994

(22) Filed: May 28, 2014

(65) Prior Publication Data

US 2014/0353234 A1    Dec. 4, 2014

(30) Foreign Application Priority Data

May 28, 2013 (DE) .......... 10 2013 008 986

(51) Int. Cl.
*B01D 35/153* (2006.01)
*B01D 27/08* (2006.01)
(Continued)

(52) U.S. Cl.
CPC .......... *B01D 35/153* (2013.01); *B01D 27/08* (2013.01); *B01D 29/13* (2013.01); *B01D 29/96* (2013.01);
(Continued)

(58) Field of Classification Search
CPC .... B01D 2201/0461; B01D 2201/4015; B01D 29/13; B01D 35/153; B01D 46/0004;
(Continued)

(56) References Cited

U.S. PATENT DOCUMENTS 5,788,859 A * 8/1998 Biere ............... B01D 17/10
                                                210/312
6,006,924 A * 12/1999 Sandford ......... B01D 29/15
                                                210/440
(Continued)

FOREIGN PATENT DOCUMENTS

DE   602006000380 T2     1/2009
EP   1714688 B1 *  1/2008 .......... B01D 35/147
(Continued)

OTHER PUBLICATIONS

AA1Car, Oil Filters, (2011) available at http://www.aa1car.com/library/oil_filters.htm. (Year: 2011).*

*Primary Examiner* — Lucas A Stelling
*Assistant Examiner* — Angel Olivera
(74) *Attorney, Agent, or Firm* — James Hasselbeck

(57) ABSTRACT

A filter device has a cup-shaped filter housing and a filter element disposed in the filter housing. A filter head is connectable to the filter housing and forms a cover for the filter housing. A spring element is provided that is acting on the filter element. The filter head has at least one first form-fit element. The filter housing has at least one second form-fit element for interacting with the at least one first form-fit element. The spring element is arranged such that the filter head and the filter housing for reaching a closed position, in which the at least one first form-fit element and the at least one second form-fit element engage each other, are movable relative to each other axially against the force of the spring element. The spring element clamps the filter (Continued)

element axially between filter head and filter housing in the closed position.

7 Claims, 2 Drawing Sheets

(51) Int. Cl.
| | | |
|---|---|---|
| *B01D 29/96* | (2006.01) | |
| *B01D 35/30* | (2006.01) | |
| *F02M 37/32* | (2019.01) | |
| *F02M 37/42* | (2019.01) | |
| *B01D 46/00* | (2006.01) | |
| *B01D 29/13* | (2006.01) | |
| *B01D 29/21* | (2006.01) | |

(52) U.S. Cl.
CPC ........... *B01D 35/30* (2013.01); *B01D 35/306* (2013.01); *B01D 46/0004* (2013.01); *B01D 46/0005* (2013.01); *B01D 29/21* (2013.01); *B01D 46/0015* (2013.01); *B01D 2201/0461* (2013.01); *B01D 2201/301* (2013.01); *B01D 2201/4007* (2013.01); *B01D 2201/4015* (2013.01); *B01D 2201/4023* (2013.01); *B01D 2201/4046* (2013.01); *B01D 2201/4061* (2013.01); *B01D 2201/4076* (2013.01); *F02M 37/32* (2019.01); *F02M 37/42* (2019.01)

(58) Field of Classification Search
CPC ................ B01D 46/0005; B01D 27/08; B01D 2201/4046; B01D 2201/4076; B01D 46/0015; B01D 2201/4061; B01D 2201/4023; B01D 2201/4007; B01D 35/30; B01D 35/306; B01D 29/96; B01D 2201/301; F02M 37/42; F02M 37/32
USPC ........................................................ 210/234
See application file for complete search history.

(56) References Cited

U.S. PATENT DOCUMENTS

| | | | |
|---|---|---|---|
| 2008/0047891 A1* | 2/2008 | Roesgen ................ | B01D 29/21 210/236 |
| 2013/0081990 A1* | 4/2013 | Roesgen ................ | B01D 35/30 210/232 |

FOREIGN PATENT DOCUMENTS

| | | | | |
|---|---|---|---|---|
| EP | 1714688 B1 | * | 1/2008 | ........... B01D 35/147 |
| WO | WO 2012025640 A1 | * | 3/2012 | ............. B01D 29/21 |
| WO | WO-2012025640 A1 | * | 3/2012 | ............. B01D 29/21 |
| WO | WO2012025640 A1 | | 3/2012 | |

* cited by examiner

FILTER HOUSING WITH LOCKING FORM-FIT ELEMENTS AND SPRING LOADING A FILTER ELEMENT IN THE HOUSING

CROSS-REFERENCE TO RELATED APPLICATION

This application claims the benefit of prior filed German patent application No. 10 2013 008 986.7 filed May 28, 2013, the entire contents of the aforesaid German patent application being incorporated herein by reference.

BACKGROUND OF THE INVENTION

The invention concerns a filter device, in particular a liquid filter, comprising a cup-shaped filter housing for receiving a filter element and comprising a filter head forming a cover and connectable with the filter housing, further comprising a spring element for supporting the filter element, wherein the filter head has at least one form-fit element having correlated therewith a corresponding form-fit element on the filter housing.

WO 2012/025640 A1 discloses a filter device for filtration of fluids that comprises, as a housing, a filter cup for receiving a hollow-cylindrical filter element. The filter cup is closed off by a filter cover having arranged at its inner side a leaf spring which exerts in the mounted state an axial pressing force onto the end face of the inserted filter element. For closing, the cover is axially placed against the force of the leaf spring in its closing position onto the housing and is subsequently rotated in the manner of a bayonet closure about the longitudinal axis of the housing until a cutout in the circumferential wall of the cover engages a radial projection on the wall of the filter cup.

During assembly, care must be taken that a fixed seat of the filter element in the housing is realized without play.

SUMMARY OF THE INVENTION

It is the object of the invention to configure with simple constructive measures a filter device in such a way that the filter element is received safely in the housing and at the same time the housing can be closed off in a reliable way.

This object is solved in accordance with the invention by a filter device wherein the spring element is arranged such that the filter head and the filter housing for reaching a closed position, in which the form-fit elements on filter head and on filter housing engage each other, are movable relative to each other axially against the force of the spring element and the spring element clamps the filter element in the closed position axially between filter head and filter housing. The dependent claims provide expedient further developments.

The object is further solved in accordance with the invention by a filter unit wherein the spring element is arranged such that the filter housing, for reaching a closed position in which the at least one form-fit element on the filter housing engages at least one corresponding form-fit element in the filter head, is to be moved relative to the filter head axially against the force of the spring element, wherein the spring element is configured to clamp the filter element in the closed position axially between the filter head and the filter housing.

The filter device serves for filtration of fluids, in particular liquids, optionally also of gases, and is used, for example, as a fuel or oil filter in motor vehicles. The filter device has a cup-shaped filter housing (filter cup) in which a receiving space for receiving a filter element is provided. The cup-shaped filter housing is to be closed off by a filter head that forms a cover and, in the mounted state, is seated on the open end face of the filter housing. In general, the filter head is mounted fixedly at the site of use, for example, a motor vehicle, while the filter housing with the filter element, as an exchangeable filter unit, is to be connected with the filter head. The filter housing is connected by means of form-fit elements form-fittingly at the filter head. Moreover, a spring element is provided which axially supports the filter element wherein the support is realized at a housing component or a filter head component.

In an advantageous embodiment of the filter device according to the invention, the spring element is at the bottom of the cup-shaped filter housing on the side which is facing away from the filter head. Due to the force of the spring element the filter element is pressed axially against the filter head. In this way, the filter element is received without play in the housing wherein also component tolerances can be compensated by means of the spring element. In an alternative embodiment, the spring element is on the side facing the filter head so that the filter element, by means of the force of the spring element, is forced in the area of the bottom against the cup-shaped filter housing. Here also, the filter element is received without play in the housing wherein component tolerances can be compensated by the spring element.

For locking or arresting filter housing on filter head, the filter housing must be forced axially against the force of the spring element so that the axial locking position at the filter head is reached and the form-fit elements at the filter head and at the filter housing can engage each other. In addition to the compensating function of the play with which the filter element is received in the housing, the filter element has thus the further task of loading the filter housing with an axial spring force that loads the filter housing in the direction of its release position. The filter housing upon mounting must be pressed axially in the direction of the closing position against the force of the spring element that may transmitted by means of the filter element, depending on the arrangement of the spring element.

In one embodiment, the spring element is arranged in a space-saving way at the bottom of the cup-shaped filter housing on the side which is facing away from the filter head. At the filter head no measures for supporting or securing the spring element are required. The spring force is transmitted instead by means of the filter element whose one end face is facing the spring element and whose oppositely positioned end face is facing the filter head. In preferred embodiment, the filter device has precisely one spring element that, as described above, has a play-compensating as well as a supporting function. No further spring elements are required in addition thereto.

The spring element is embodied, for example, as a coil spring that is loaded by pressure and therefore generates an appropriate spring force. However, also other configurations are conceivable as spring element, for example, leaf springs or plate springs.

According to a further expedient embodiment, a central tube is integrated into the filter element and improves the stability of the filter element. Expediently, the filter element is of a hollow-cylindrical configuration and is flowed through in radial direction by the fluid to be purified wherein the interior in the filter element forms an axial flow space. The filter element can be flowed through radially from the exterior to the interior so that the outwardly positioned wall surface is the raw side and the interior space is the clean side. The central tube lines the interior in the filter element.

According to a further expedient embodiment, the force of the spring element is transmitted through the central tube. The central tube is supported directly or indirectly in the area of an end face on the spring element. In an arrangement of the spring element at the bottom of the filter housing, the central tube is supported still in the area of the oppositely positioned end face at the filter head. This embodiment has the advantage that the filter means of the filter element is relieved of supporting and spring forces that are transmitted instead in axial direction by means of the central tube.

According to a further expedient embodiment, the filter head has a circumferentially extending cylindrical wall which projects into the cup-shaped filter housing in the closed position. The cylindrical wall imparts additional stability to the filter head in closed position. The wall of the filter head is positioned in the closed position immediately on the inner wall of the cup-shaped filter housing.

Also, a configuration is conceivable in which the wall of the filter head encloses the wall of the filter housing, i.e., has a greater outer diameter than the filter housing.

Into the wall of the filter head, a form-fit element is expediently integrated that interacts with a corresponding form-fit element in or on the wall of the filter housing. For example, the filter head has as a form-fit element a cutout in its wall while the form-fit element on the filter housing is embodied as a radially protruding projection which in the closed position projects into the cutout of the filter head. The radially protruding projection on the filter housing is located preferably at the radial inner side of the wall which corresponds with a filter head wall that is inserted into the filter housing. The projection on the filter housing wall can be of a triangular shape wherein the triangle tip is pointing radially inwardly and the axial top side and bottom side of the triangular projection are planar. In this way, it is ensured that in the form-fit position when the projection projects into the cutout at the filter head, an accidental release of the form-fit connection between the filter head and the filter housing is prevented. Due to the axial force of the filter element and/or of the spring element, the filter housing is pressed axially outwardly so that in this way the bottom side of the projection on the filter housing contacts the wall that delimits the cutout at the filter head.

For assembly, the form-fit connection is achieved in that, in the manner of a bayonet closure, first the filter housing is placed against the axial force of the spring element onto the filter head and subsequently is rotated about the longitudinal axis of the filter until the projection on the filter housing projects into the cutout on the filter head. For release of the form-fit connection, a movement in the opposite direction is carried out correspondingly wherein first the filter housing is rotated about the longitudinal axis of the filter until the projection is disengaged from the cutout so that the filter housing can then be axially removed.

For reasons of an improved distribution of the holding or locking force in the circumferential direction, it may be expedient to have distributed about the circumference several form-fit elements on the filter element as well as, correlated thereto, on the filter housing. For example, three cutouts on the filter head are distributed about the circumference and three projections are arranged on the filter housing.

On the filter head, a support section for axial support of the filter element is expediently provided. The support section is in particular arranged with radial spacing relative to the outer diameter; it has thus a smaller diameter than the outer diameter of the filter head. In the embodiment of the filter element with integrated central tube, the latter is supported directly or indirectly on the support section of the filter head. The support section in the filter head can be provided with a flow cutout which communicates with the interior in the filter element so that upon radial inflow from the exterior the purified fluid flows out axially through the interior and the cutout in the support section of the filter head. By means of the support section, preferably an axial and/or radial sealing action is provided in addition to the axial support. In this context, the support section transmits forces in axial direction and forces the seal against the filter head so that a clamping action and a sufficient sealing force are provided.

BRIEF DESCRIPTION OF THE DRAWINGS

Further advantages and expedient embodiments can be taken from the additional claims, the figure description, and the drawings.

In the Figures, same components are provided with same reference characters.

DESCRIPTION OF PREFERRED EMBODIMENTS

Figure 1:
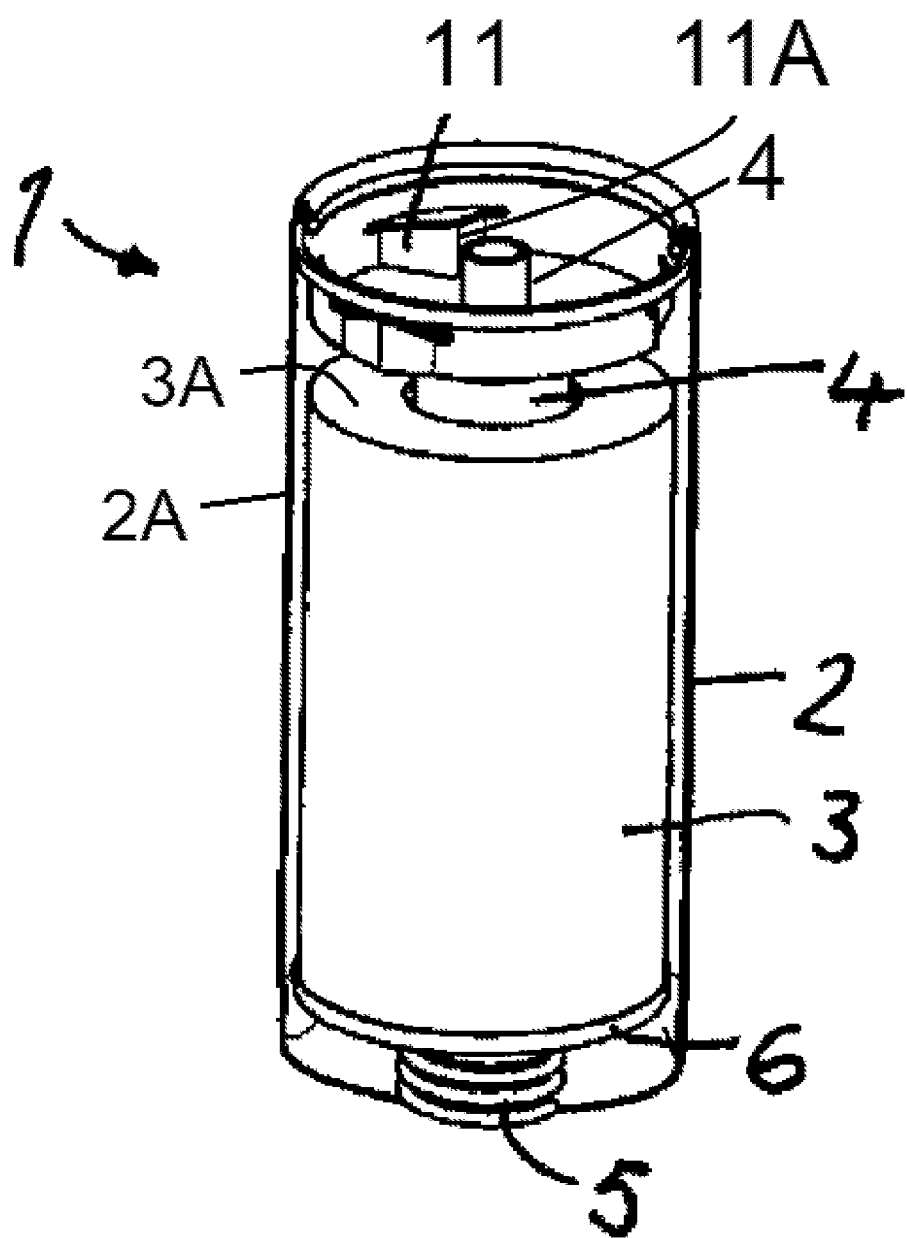
FIG. 1 shows in a perspective view a filter unit with a cup-shaped filter housing and a filter element inserted therein, with a spring element at the bottom of the filter housing for supporting the filter element.
Figure 2:
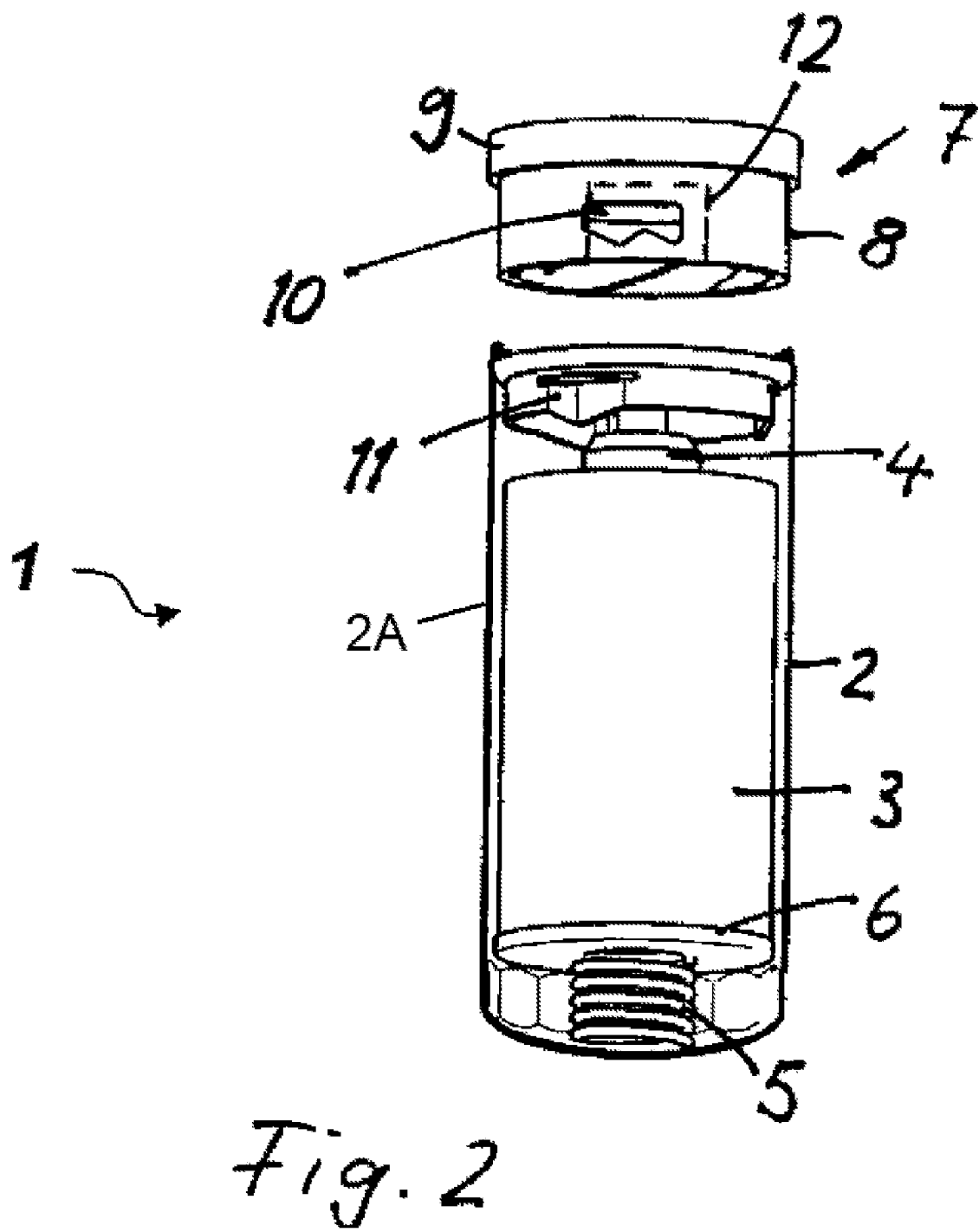
FIG. 2 is a filter device with a filter unit and a filter head forming a cover.

In FIGS. 1 and 2, a filter unit 1 or a filter device, comprising the filter unit 1 and a cover, for filtration of fluids, in particular fluids such as e.g. oil or fuel, is illustrated. The filter unit 1 has a cylindrical cup-shaped filter housing 2 in which a filter element 3 is received that is flowed through by the fluid in radial direction from the exterior to the interior. The filter element 3 is of a hollow-cylindrical configuration and has a stabilizing central tube 4 which lines an interior in the filter element 3 that constitutes the clean side through which the purified fluid can flow out axially. The central tube 4 forms a support frame and is expediently made of plastic material. The central tube 4 has a plurality of openings or cutouts through which the fluid for filtration can flow in radially from the exterior to the interior into the inner clean chamber.

At the bottom of the cup-shaped filter housing 2, there is a spring element 5 that is embodied as a coil spring and is resting against the end face of the filter element 3 and axially supports the latter. The spring element 5 loads in particular the central tube 4 so that the filter medium of the filter element 3 which is placed around the central tube 4 must not absorb support forces. Optionally, the support action is realized by means of a bottom end disk 6 which is located at the bottom end face of the filter element 3.

The open end face of the filter housing 2, which is opposite the bottom and through which the filter element 3 is insertable or removable, can be closed off by a filter head 7 that forms a cover of the filter housing 2. The filter head 7 has a circumferentially extending cylindrical wall 8 which has a smaller outer diameter than the filter housing 2 and is insertable through the open end face into the filter housing 2. The filter head 7 has an end disk 9 which is of a slightly greater diameter than the wall 8 so that an annular shoulder is formed with which the filter head 7 in the inserted, mounted state is resting on the end face edge of the wall of the filter housing 2.

Several cutouts 10 are provided, distributed about the circumference, in the axially projecting outer wall 8 of the filter head 7 and constitute form-fit elements that interact with radially inward projections 11 that are arranged as form-fit elements on the inner side of the cylindrical outer wall 2A of the filter housing 2. In the mounted state, the projections 11 project into the cutouts 10 so that in axial direction as well as in circumferential direction a form-fit connection between the filter head 7 and the filter housing 2 is realized.

The projections 11 on the inner side of the cylindrical outer housing wall 2A have a triangular shape wherein the pointed side of the triangle 11A is facing in radial direction inwardly and projects towards the central tube 4. The top and the bottom side of the triangular projection 11 have a flat configuration. For assembly, the filter housing 2 is axially placed onto the filter head 7 so that a support section 12 which is formed monolithic with the filter head 7 contacts a section of the central tube 4 which projects past the end face 3A of the filter element 3. In this way, the spring force of the spring element 5 acts through the central tube 4 and thereby also onto the filter head 7. The axial movement of the filter element relative to the filter housing 2 thus occurs against the force of the spring element 5.

After the filter housing 2 has reached its axial mounting position, the filter housing 2 is rotated in the manner of a bayonet closure about the longitudinal axis of the filter until the projections 11 at the inner housing wall are in engagement with the cutouts 10 in the wall 8 of the filter head 7. Due to the force of the spring element 5, the filter housing 2 is axially force-loaded in the direction of its release position so that the bottom end face of the projection 11 contacts the wall of the filter head 7 which is delimiting the cutout 10 in the wall 8. Axial release is thus prevented. The connection can only be canceled in that, in accordance with the bayonet closure, first a rotational movement of the filter housing 2 relative to the filter head 7 is performed so that the projection 11 is disengaged from the cutout 10 and subsequently the filter housing 2 is axially removed.

Distributed about the circumference there are expediently several, for example, three, cutouts 10 or corresponding projections 11.

In addition to the function of exerting an axial force on the filter head 7, the spring element 5 has also the task of tolerance or play compensation for the filter element 3. Due to the axial force loading of the filter element 3, an axial play is prevented. Moreover, by the force exertion on the filter head 7, a reliable sealing action of an axial seal, embodied between filter element 3 and filter head 7, is ensured between clean side and raw side.

In a variant of the filter element 1 that is not illustrated, the spring element 5 is not arranged at the bottom of the filter housing 2 but at the end face of the filter element 3 that is facing the opening of the filter housing 2. Here, the assembly of the filter unit 1 at the filter head 7 is also performed against an axially acting force. In the mounted state of the filter device, the spring element 5 does not force the filter element 3 against the filter head 7 but against the closed end area of the filter housing 2. Axial play is prevented due to the axial force loading of the filter element 3.

While specific embodiments of the invention have been shown and described in detail to illustrate the inventive principles, it will be understood that the invention may be embodied otherwise without departing from such principles.

What is claimed is:
1. A filter device comprising:
a cup-shaped filter housing, having:
   an axially extending cylindrical outer wall, the cylindrical outer wall closed at a bottom end face of the filter housing by a closed bottom wall;
   wherein an opposite end face of the cylindrical outer wall of the filter housing is an open end face, the cylindrical outer wall having:
      at least one radially protruding projection arranged on a radially inner side the cylindrical outer wall and projecting radially inwardly;
a hollow-cylindrical filter element disposed in the filter housing and is insertable or removable through the open end face of the cup-shaped filter housing, the filter element having:
   a first axial end face and an axially opposing second axial end face; and
   a central tube fixedly integrated into the filter element and extending through a hollow interior of the filter element from the first axial end face to the second axial end face of the filter element;
a filter head detachably connected to the filter housing, forming a cover on the open end face of the filter housing, the filter head having:
   a filter head end disk having a larger diameter than the open end face of the axially extending cylindrical outer wall of the filter housing, the filter head end disk forming a shoulder resting against an end face edge of the open end face of the axially extending cylindrical outer wall of the filter housing;
   an axially projecting cylindrical wall formed as a cylinder on an axially inner side of the filter head end disk, the axially projecting cylindrical wall contacting against a radially inner side of the axially extending cylindrical outer wall of the filter housing, the axially projecting cylindrical wall having a smaller diameter than the cylindrical axially extending outer wall of the filter housing, the axially projecting cylindrical wall of the filter head inserted through the open end face of the filter housing; and
   at least one cutout provided in a radially outer side of the axially projecting cylindrical wall of the filter head and extending from a radially outer side towards a radially inner side of the axially projecting cylindrical outer wall of the filter head;
wherein the at least one radially protruding projection of the filter housing projects into the at least one cutout of the axially projecting cylindrical wall of the filter head when the filter housing and filter head are in a closed position;
a spring element having a first end arranged on the bottom wall of the filter housing and an opposite second end contacting against the central tube of the filter element, the spring element pressing on the central tube and moving the filter element with the central tube into direct contact against the filter head;
wherein the spring element clamps the filter element with the central tube directly against the filter head, when the filter head and the filter housing are in the closed position;
wherein the at least one radially protruding projection of the filter housing and the at least one cutout of the axially projecting cylindrical wall of the filter head engage each other, are held in engagement by the spring element, and are movable relative to each other axially against a force of the spring element, when the filter housing with the filter element is moved to the closed position against the filter head;

wherein the central tube extends from the second axial end face of the filter element, through the hollow interior of the filter element, continues through the first axial end face of the filter element and projects outwardly past the first axial end face of the filter element to an outwards end section of the central tube;

wherein, in the closed position, the outwards end section of the central tube projecting outwardly past the filter element is axially pressed against and axially loads against a support section formed monolithic with the filter head to transfer the force of the spring element from the bottom wall of the housing, through the central tube of the filter element and onto the support section of the filter head, the axial loading thereby sealing the central tube to the filter head;

wherein the spring element directly loads the central tube.

2. The filter device according to claim 1, wherein the spring element is a coil spring.

3. The filter device according to claim 1, wherein
the support section axially supports the filter element,
wherein the support section is arranged at a radial spacing inwardly relative to an outer diameter of the filter head.

4. The filter device according to claim 1, wherein
the filter housing, during a closing movement into the closed position, is moved first axially onto the filter head and subsequently rotated in a rotational direction about a longitudinal axis of the filter element.

5. The filter device according to claim 1, wherein
the radially protruding projection is of a triangular shape.

6. The filter device according to claim 1, wherein
the at least one radially inwardly protruding projection is triangular and having a pointed side of the triangle projecting in a radial direction inwards towards the central tube from the radially inner side of the axially extending cylindrical outer wall of the filter housing; and wherein the pointed side of the triangle of the at least one radially protruding projection projects radially inwardly into and engages into the at least one cutout of the axially projecting cylindrical wall of the filter head, locking the filter housing and filter head together when in the closed position.

7. A filter unit comprising:
a cup-shaped filter housing, having:
an axially extending cylindrical outer wall, the cylindrical outer wall closed at a bottom end face of the filter housing by a closed bottom wall;

wherein an opposite end face of the cylindrical outer wall of the filter housing is an open end face, the cylindrical outer wall having:
at least one radially protruding projection arranged on a radially inner side the cylindrical outer wall and projecting radially inwardly;

a hollow-cylindrical filter element disposed in the filter housing and is insertable or removable through the open end face of the cup-shaped filter housing, the filter element having:
a first axial end face and an axially opposing second axial end face; and
a central tube fixedly integrated into the filter element and extending through a hollow interior of the filter element from the first axial end face to the second axial end face of the filter element;

wherein the at least one radially inwardly protruding projection of the filter housing is a configured to project into at least one cutout of a filter head when the filter housing and filter head are in a closed position;

where the at least one radially inwardly protruding projection of the axially extending cylindrical outer wall is triangular and having a pointed side of the triangle projecting in a radial direction inwards towards the central tube from the radially inner side of the axially extending cylindrical outer wall of the filter housing;

a spring element having a first end arranged on the bottom wall of the filter housing and an opposite second end contacting against the central tube of the filter element, the spring element pressing on the central tube and moving the filter element with the central tube into direct contact against the filter head;

wherein the spring element clamps the filter element with the central tube directly against the filter head, when the filter head and the filter housing are in the closed position;

wherein the central tube extends from the second axial end face of the filter element, through the hollow interior of the filter element, continues through the first axial end face of the filter element and projects outwardly past the first axial end face of the filter element to an outwards end section of the central tube;

wherein the spring element contacts directly loads the central tube.

* * * * *